US010222295B2

(12) United States Patent
Medley

(10) Patent No.: US 10,222,295 B2
(45) Date of Patent: Mar. 5, 2019

(54) SYSTEM FOR MEASURING VELOCITY AND ACCELERATION PEAK AMPLITUDE ON A SINGLE MEASUREMENT CHANNEL

(71) Applicant: Computational Systems, Inc., Knoxville, TN (US)

(72) Inventor: Michael D. Medley, Knoxville, TN (US)

(73) Assignee: Computational Systems, Inc., Knoxville, TN (US)

(*) Notice: Subject to any disclaimer, the term of this patent is extended or adjusted under 35 U.S.C. 154(b) by 427 days.

(21) Appl. No.: 14/930,169

(22) Filed: Nov. 2, 2015

(65) Prior Publication Data

US 2016/0123838 A1  May 5, 2016

Related U.S. Application Data

(60) Provisional application No. 62/075,200, filed on Nov. 4, 2014.

(51) Int. Cl.
| | |
|---|---|
| *G01M 13/00* | (2006.01) |
| *G01P 15/00* | (2006.01) |
| *G01H 1/00* | (2006.01) |
| *G01P 15/04* | (2006.01) |

(52) U.S. Cl.
CPC .............. *G01M 13/00* (2013.01); *G01H 1/00* (2013.01); *G01P 15/04* (2013.01); *G01P 15/00* (2013.01)

(58) Field of Classification Search
CPC ........ G01M 13/00; G01P 15/04; G01P 15/02; G01P 15/00; G01H 1/00
See application file for complete search history.

(56) References Cited

U.S. PATENT DOCUMENTS

| 4,612,620 A * | 9/1986 | Davis ................ G01H 1/00 |
| | | 702/184 |
| 2012/0041695 A1* | 2/2012 | Baldwin ............ G01H 1/003 |
| | | 702/56 |

* cited by examiner

*Primary Examiner* — Toan Le
(74) *Attorney, Agent, or Firm* — Luedeka Neely Group, P.C.

(57) ABSTRACT

The system implements an algorithm that allows an integrator providing a vibration velocity measurement to be disabled automatically in order to do a PeakVue measurement. When the PeakVue measurement is required, the integrator is disabled and the last Overall velocity measurement is maintained. Once the PeakVue measurement is complete, the integrator is re-enabled and the Overall measurements resume.

20 Claims, 9 Drawing Sheets

SYSTEM FOR MEASURING VELOCITY AND ACCELERATION PEAK AMPLITUDE ON A SINGLE MEASUREMENT CHANNEL

RELATED APPLICATIONS

This application claims priority to provisional patent application Ser. No. 62/075,200 entitled "System for Measuring Velocity and Acceleration Peak Amplitude (PeakVue) on a Single Measurement Channel," filed Nov. 4, 2014.

FIELD

This invention relates to the field of machine vibration monitoring. More particularly, this invention relates to a system for measuring a velocity signal and an acceleration peak amplitude signal (PeakVue) using a single measurement channel.

BACKGROUND

An online vibration monitoring system is a measurement system that automatically collects vibration data in a continuous fashion. When such a system is installed, the user configures the system for the type of data that is to be collected and under what conditions, and the system then runs automatically, without human intervention, 24/7, per its configuration. One example of this type of system is the CSI 6500 Machinery Health Monitor manufactured by Emerson Process Management.

Many online vibration monitoring systems, including the CSI 6500, use hardware integration to transform an acceleration signal into a velocity signal. Once the system is configured, a channel is either a velocity channel that uses a hardware integrator or an acceleration channel that bypasses the hardware integrator, until the system is reconfigured.

As the term is used herein, "Overall Vibration" is a measure of the total vibration amplitude over a wide range of frequencies. An Overall Vibration measurement, also referred to as a Gross Scan (GS) measurement, is a single broadband value that is relatively easy to collect, process, analyze and trend. The CSI 6500 is operable to measure Overall Vibration continuously and simultaneously on all channels once per second. The system can also be configured to additionally make a more detailed measurement on a pair of channels, which may be done on a periodic basis or triggered by the level of the Overall Vibration (and other inputs, such as Speed).

A significant limitation, however, is the restriction that a channel may be configured to measure either velocity or acceleration, but not both at the same time. A desired use case is to monitor velocity continuously and trending Overall Vibration in velocity (e.g., inches/second), but also to periodically make a more detailed acceleration measurement, such as a PeakVue measurement. This has not been possible with prior versions of the CSI 6500 unless two separate channels were used (one for velocity and one for acceleration). However, most users do not want to use two separate channels for this purpose, because twice as many channels are needed in the measurement system, which increases the cost.

What is needed, therefore, is a solution that eliminates this limitation in the prior art, preferably with no change to the measurement hardware.

SUMMARY

The above and other needs are met by an online vibration measurement system with multiplexed channels that makes a periodic acceleration measurement, such as a PeakVue measurement, on a channel with a hardware integrator that normally measures only velocity.

In some embodiments, the system briefly interrupts monitoring of Overall Vibration (Gross Scan) in velocity units to bypass the hardware integrator and make a PeakVue measurement in acceleration units.

In some embodiments, the system is prevented from being configured in such a way that Overall Vibration monitoring is interrupted (or locked out) for more than one minute for a PeakVue measurement.

In some embodiments, the system monitors Overall Vibration levels during each switch (disable and re-enable of the integrator) to algorithmically determine when the measurement has settled, and thereby minimize the amount of time that Overall Vibration monitoring is interrupted.

In some embodiments, the system maintains the last valid Overall Vibration velocity measurement while the system is performing the PeakVue acceleration measurement.

In some embodiments, the system ensures that external systems (i.e. Distributed Control Systems) that may be monitoring the Overall Vibration velocity measurement do not receive invalid data during the PeakVue acceleration measurement.

In some embodiments, the system determines whether to make a velocity or PeakVue measurement based on the state of the equipment being monitored, where state refers to Overall Vibration levels, discrete input state, or speed.

Some preferred embodiments provide a vibration measurement system for continuously monitoring vibration levels of a machine. The system has multiple measurement channels for measuring vibration at one or more locations on the machine. At least one of the multiple measurement channels includes an acceleration sensor, an integrator, a switch, and selection logic. The acceleration sensor is attached to the machine for sensing machine vibration and generating an analog acceleration signal based on the machine vibration. The integrator receives the analog acceleration signal and generates an analog velocity signal based thereon. The switch, which receives the analog acceleration signal and the analog velocity signal, has a first position in which the analog velocity signal is selected, and a second position in which the analog acceleration signal is selected. The switch normally maintains the first position, during which time the system continuously monitors the analog velocity signal or a signal derived from the analog velocity signal to assess an operating condition of the machine. The switch is operable to be momentarily set to the second position, during which time monitoring of the analog velocity signal is interrupted to provide for momentary measurement of the analog acceleration signal. The selection logic generates a first control signal based on one or more input signals that indicate a state of the machine. The first control signal causes the switch to be in the first position or the second position.

In another aspect, the invention provides a method for continuously monitoring vibration levels at one or more locations on a machine using a vibration measurement system having multiple measurement channels. In a preferred embodiment, the method includes:

(a) in a first measurement channel of the multiple measurement channels, sensing machine vibration at a first location on the machine and generating a first analog acceleration signal based on the machine vibration;

(b) integrating the first analog acceleration signal using a hardware integrator in the first measurement channel to generate an analog velocity signal;

(c) continuously monitoring the analog velocity signal or a signal derived from the analog velocity signal using the first measurement channel;
(d) generating a first control signal based at least in part on one or more input signals that indicate a state of the machine;
(e) in the first measurement channel, discontinuing the monitoring of the analog velocity signal and commencing an acceleration measurement period based on the first control signal;
(f) measuring the first analog acceleration signal using the first measurement channel during the acceleration measurement period; and
(g) upon conclusion of the acceleration measurement period, resuming the continuous monitoring of the analog velocity signal using the first measurement channel.

In yet another aspect, the invention provides a method for continuously monitoring vibration levels of a machine using a vibration measurement system having multiple measurement channels. In a preferred embodiment, the method includes:
(a) continuously sensing machine vibration at multiple locations on the machine and generating multiple analog acceleration signals in the multiple measurement channels based on the machine vibration;
(b) in each measurement channel in which velocity measurements are enabled, integrating the analog acceleration signal using a hardware integrator in the measurement channel to generate an analog velocity signal;
(c) continuously monitoring analog velocity signals generated in step (b) or signals derived from analog velocity signals generated in step (b);
(d) continuously monitoring one or more input signals that are indicative of an operational state of the machine;
(e) determining based on the one or more input signals that acceleration measurements are to be made in at least a first measurement channel of the multiple measurement channels;
(f) disabling velocity measurements in the first measurement channel by bypassing the hardware integrator in the first measurement channel;
(g) performing acceleration measurements in the first measurement channel; and
(h) upon conclusion of performance of acceleration measurements in the first measurement channel, enabling velocity measurements in the first measurement channel by enabling operation of the hardware integrator.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
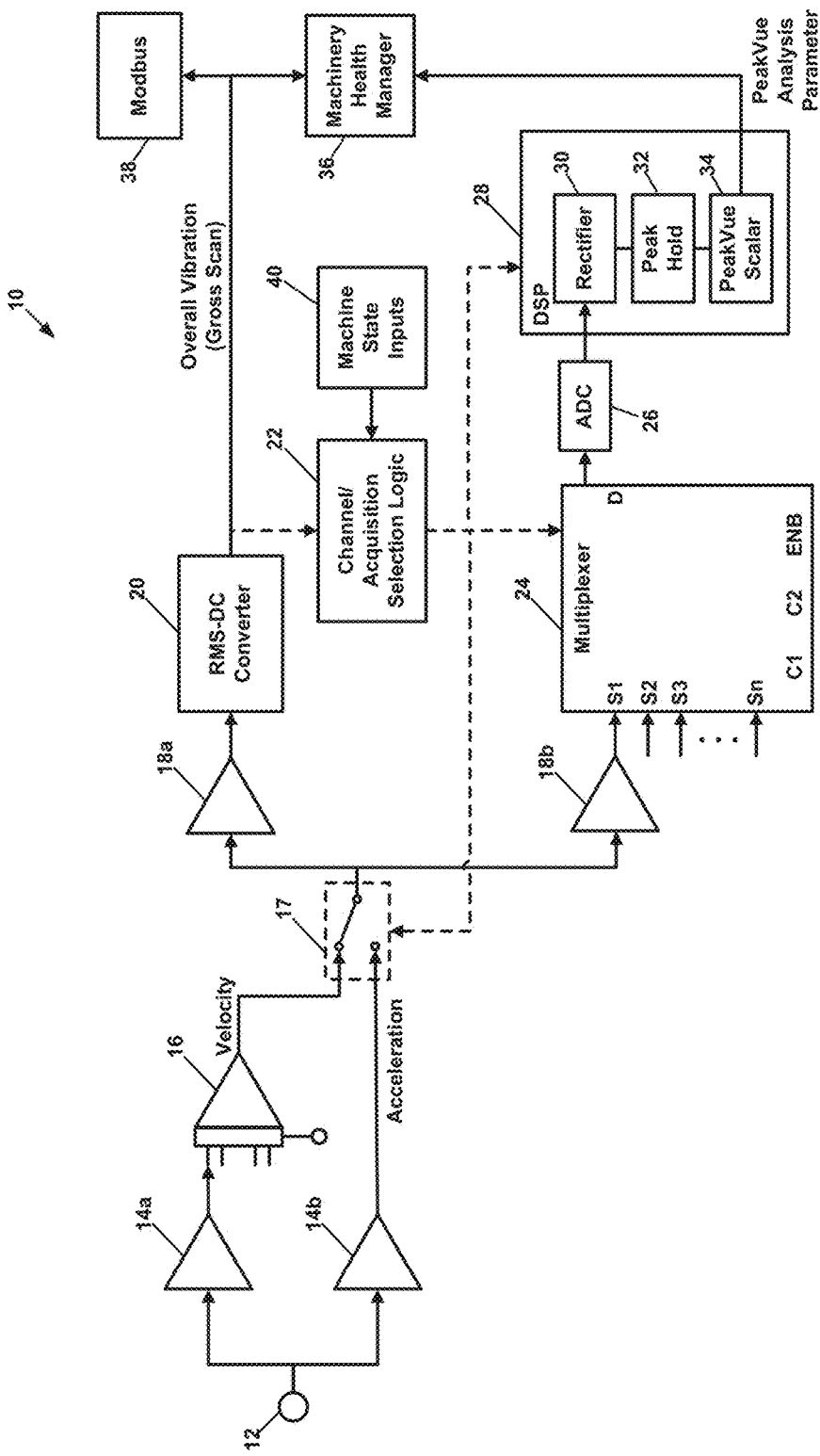
FIG. 1 depicts a single measurement channel of a vibration measurement and processing system according to an embodiment of the invention.

FIG. 1 depicts a preferred embodiment of a single channel of a vibration measurement system 10. A sensor 12, such as an accelerometer, generates an analog vibration acceleration signal that is split into two paths and amplified by signal conditioning amplifiers 14*a*-14*b*. One of the signal paths is integrated by the hardware integrator 16 to generate a velocity signal based on the acceleration signal. A programmable switch 17 selects either the acceleration signal or velocity signal for processing.

The selected signal is split again into two paths and is further amplified by signal conditioning amplifiers 18*a*-18*b*. One signal path goes to an RMS-DC converter 20 that generates an Overall Vibration signal, which is also referred to herein as a Gross Scan (GS) signal. This Overall Vibration signal may be based on either an acceleration signal or a velocity signal, depending on the setting of the switch 17. In a preferred embodiment, the Overall Vibration signal is transmitted via a Modbus serial communications link 38, such as to a Distributed Control System (DCS). The Overall Vibration signal may also be published to asset management software 36, such as Emerson Process Management's Machinery Health Manager.

The other path from the switch 17 goes to an input $S_1$ of a signal multiplexer 24. Signals from other channels of the vibration measurement system 10 are provided to signal inputs $S_2$ to $S_n$, where n=8 in a preferred embodiment. The selected signal at the output D of the multiplexer 24 is digitized and processed in an analog-to-digital converter (ADC) 26 and digital signal processor (DSP) 28. In some embodiments, the ADC 26 and DSP 28 are implemented in a field programmable gate array (FPGA). The output of the DSP 28 may be a velocity or acceleration time waveform, a velocity or acceleration spectrum, a PeakVue waveform, or other analysis parameters, depending on the position of the switch 17 and the programming and setup parameters of the DSP 28.

In a preferred embodiment, the DSP 28 implements a full-wave rectifier circuit 30 for receiving and full-wave-rectifying the digitized vibration data, and a peak hold circuit 32 for generating a peak hold waveform comprising peak levels of the full-wave-rectified digital vibration data. The DSP 28 also preferably includes a PeakVue calculation circuit 34 for calculating a scalar value representing a peak level measured over a predetermined time or a predetermined number of data samples in the peak hold waveform.

As the term is used herein, "PeakVue" refers to a scalar value representing the peak level of the filtered and full-wave-rectified vibration waveform (as described in U.S. Pat. No. 5,895,857 to Robinson et al.—incorporated herein by reference) measured over a sampling time period determined by either a minimum number of tachometer periods or a programmable time delay In a preferred embodiment, channel acquisition/selection logic 22 receives input signals indicative of the state of the machine being monitored, which input signals may include machine speed, Overall Vibration, and an external discrete input (DI), which is a relay state (high/low, 1/0) driven by an external stimulus. The output of the logic 22 includes (1) the state of the switch 17, (2) which of the input channels $S_1$ to $S_n$, to provide to the output channel D of the multiplexer 24, and (3) the type of vibration measurement to be performed in the DSP 28.

Figure 2:
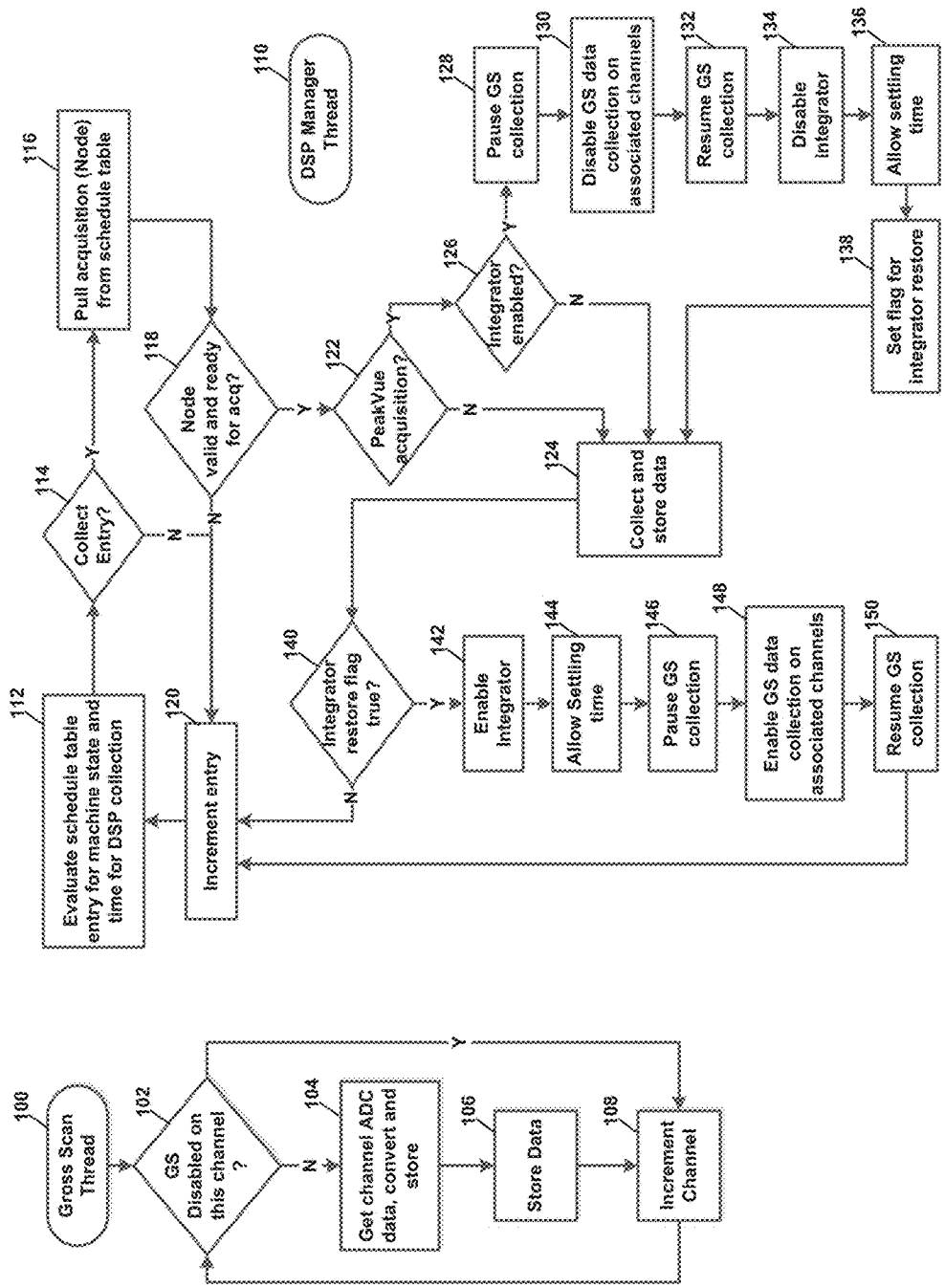
FIG. 2 depicts a Gross Scan and DSP Manager processing threads according to an embodiment of the invention.

A preferred embodiment of a process for automatically disabling the integrator 16 in order to make acceleration-based measurements is depicted in FIG. 2. The process comprises two independent threads: a Gross Scan thread 100 and a DSP Manager thread 110. Both threads run simultaneously and continuously. The Gross Scan thread 100, shown on the left side of FIG. 2, collects the Overall Vibration values on all of the $S_n$ measurement channels all the time. The DSP Manager thread 110, shown on the right side of FIG. 2, makes more detailed vibration measurements using the DSP 28.

In the preferred embodiment, data are collected for the detailed vibration measurements only when certain specified, configurable criteria are TRUE. These measurements are preferably maintained as a list of entries in what is referred to herein as a schedule table. Each entry in the schedule table preferably has its own set of criteria (machine states and/or elapsed time) for data collection to occur. The DSP Manager thread 110 steps through the entries in the schedule table and evaluates the criteria of each entry to determine whether or not a data collection is warranted (steps 112 and 114 in FIG. 2). If the specified criteria for machine state (configured combination of Overall Vibration, speed, and/or DI across all channels) is TRUE, or if a specified amount of time has expired since the last time data was collected for an entry, then a data collection is initiated (steps 116 and 118). If the measurement entry is a PeakVue measurement (step 122) (or any other measurement that requires acceleration) and the integrator 16 is enabled (step 126) (which would result in an invalid acceleration measurement) then, prior to making the acceleration measurement, the DSP Manager thread 110 pauses the associated Gross Scan channel (step 128) (i.e., by setting a skip flag), disables the integrator 16 in that channel (step 134), waits for the data to settle (step 136), collects the data for the requested measurement and stores/reports the result at the host 36 (step 124). Before moving to the next entry in the table, the DSP Manager re-enables the integrator 16 (step 142) (if it was disabled for the particular measurement), waits again for the data to settle (step 144), and removes the skip flag for the associated GS channel (step 148).

In some embodiments, the system is monitoring the Overall Vibration (OV) signal immediately after re-enabling the integrator (step 142), but the Overall Vibration value is not being reported. The purpose of monitoring the OV signal is to determine, algorithmically, when the measurement has settled. Once the algorithm determines that the OV signal has adequately settled, the system begins reporting the OV value. This process decreases the amount of time that the OV reporting is interrupted by the switch. If not monitoring the OV value, it may be necessary to wait a very long user-preconfigured time (~30 seconds, fixed) to be sure that settling has completed.

In the Gross Scan thread 100, there is a decision in each channel as to whether or not to measure and update the associated Overall Vibration value. If the skip flag has been set for a particular channel indicating that the integrator 16 is to be bypassed (step 102), that channel will be skipped in the Overall Vibration monitoring process.

Figure 3:
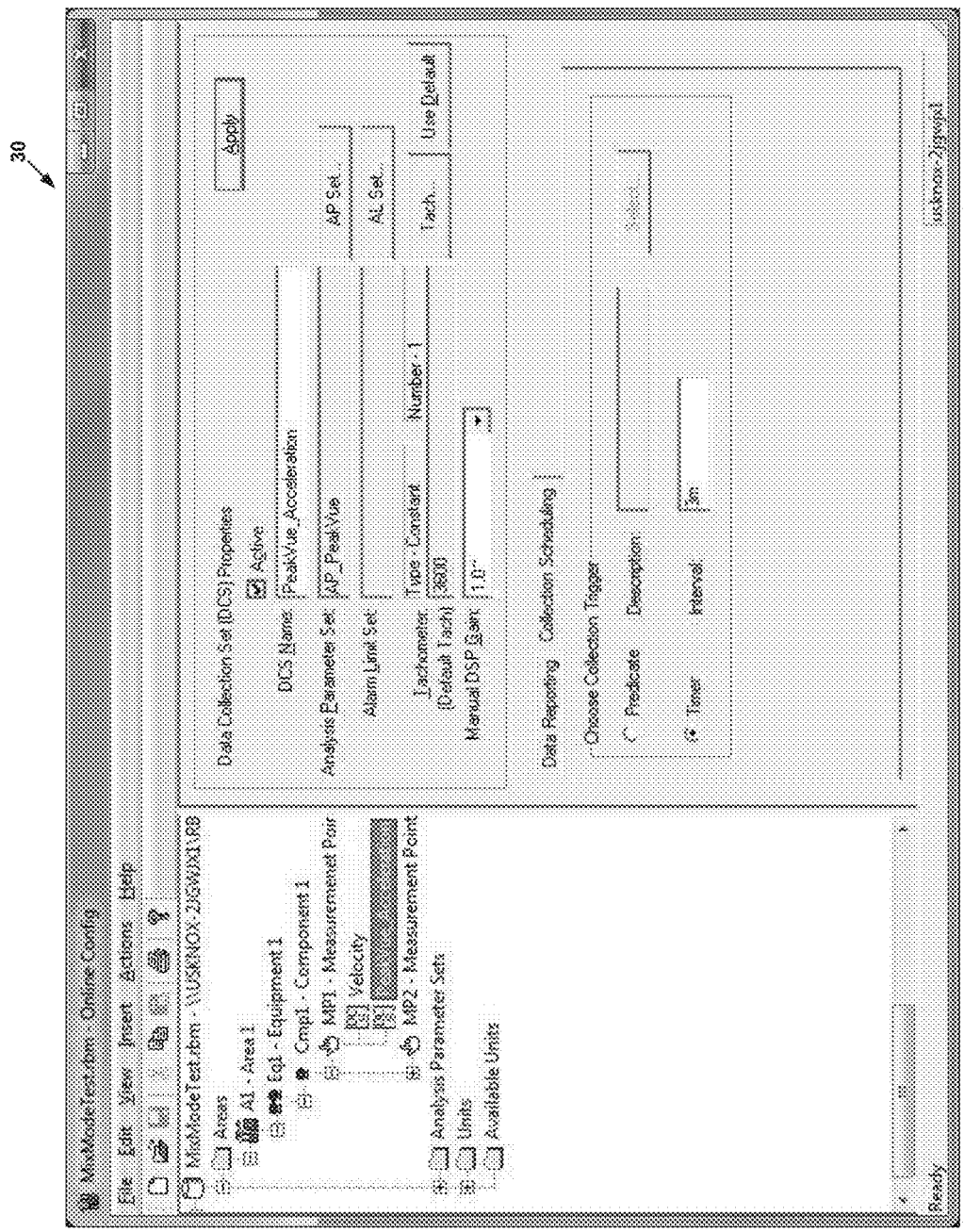
FIG. 3 depicts a configuration screen according to an embodiment of the invention.

FIG. 3 depicts a display screen generated by Machinery Health Manager software 36 for reconfiguring a channel configured for a velocity measurement (with the hardware integrator switched in) to make a PeakVue measurement. In a preferred embodiment, a warning is displayed to notify the user that the Gross Scan measurement will be interrupted while the PeakVue acquisition is underway.

Figure 4:
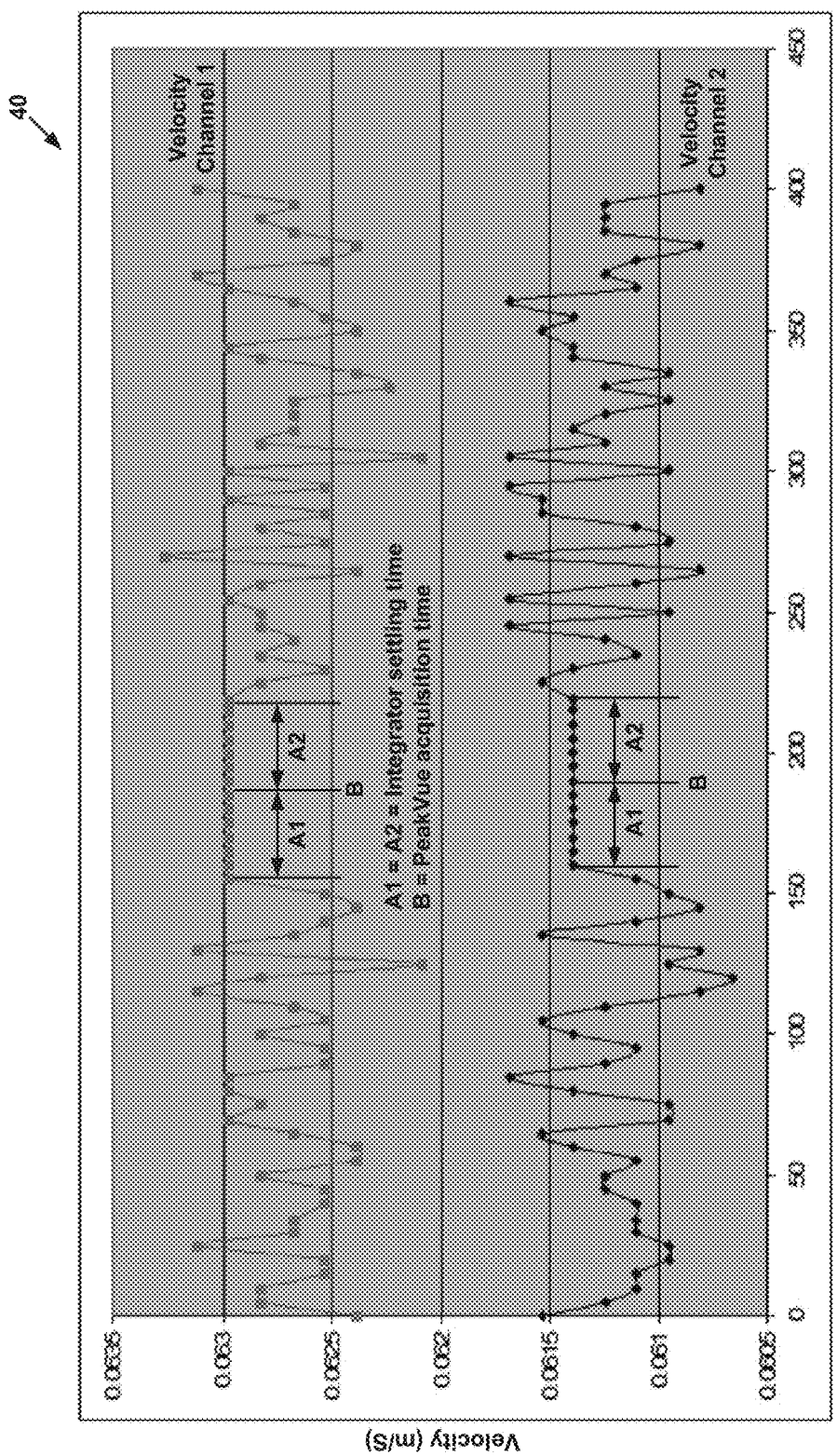
FIGS. 4 and 5 depict data plots according to an embodiment of the invention.
Figure 5:
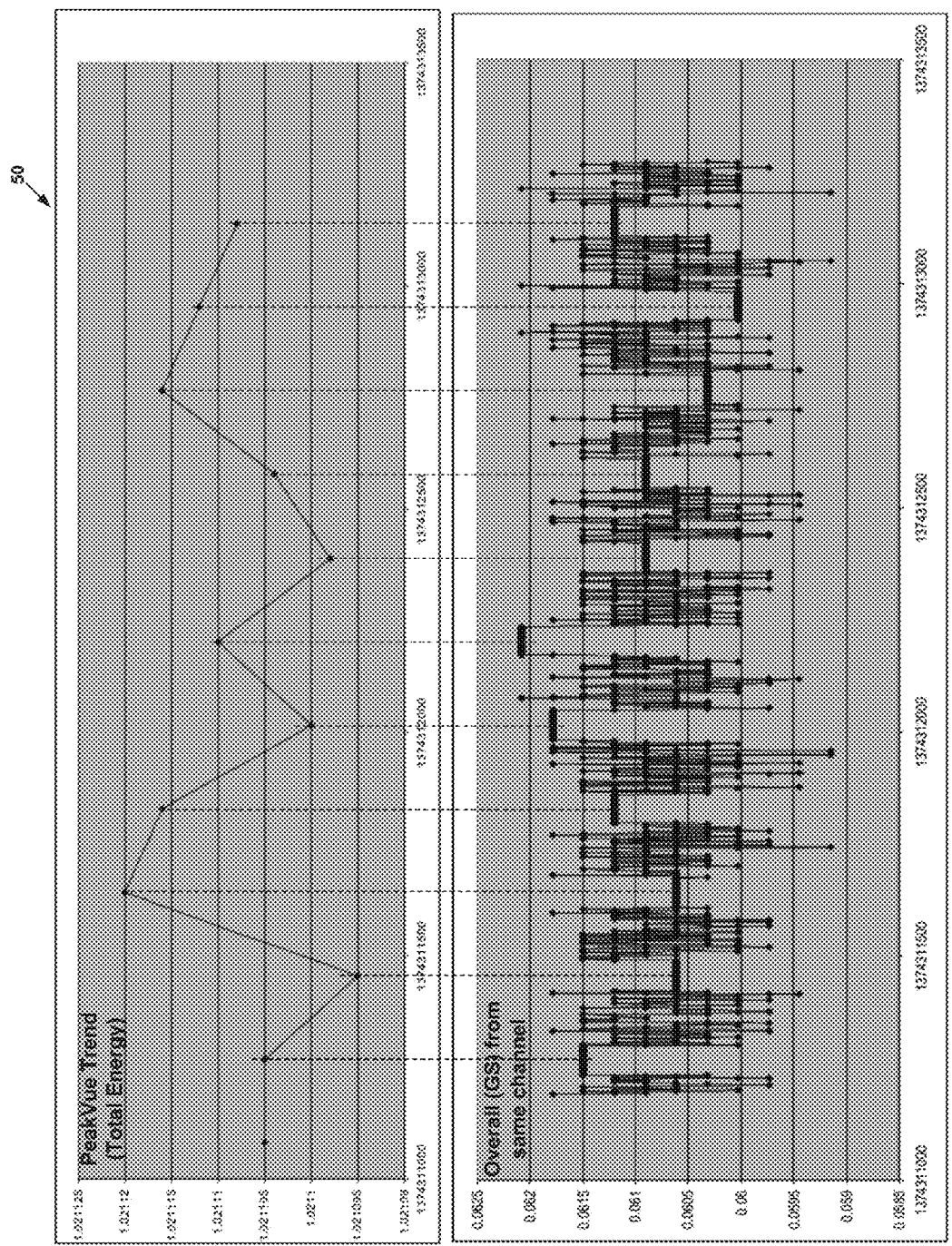

FIGS. 4 and 5 illustrate how the data appears in a Modbus client. This data was collected with Modbus 38 requesting the Gross Scan (GS) data every 5 seconds. During this particular PeakVue data acquisition, there is a 60 second total delay to allow for the settling time when the integrator 16 is switched in/out. In a preferred embodiment, the delay period includes a 30 second settling time (A1) after switching out the integrator 16, the actual PeakVue measurement time (B), and another 30 second delay (A2) before switching the integrator 16 back in after the PeakVue data acquisition. During the delay period, the GS value is not updated, and it maintains the last value that was read by Modbus prior to the delay period. FIG. 5 shows how the PeakVue acceleration measurements are interleaved with the higher density velocity measurements.

Figure 6:
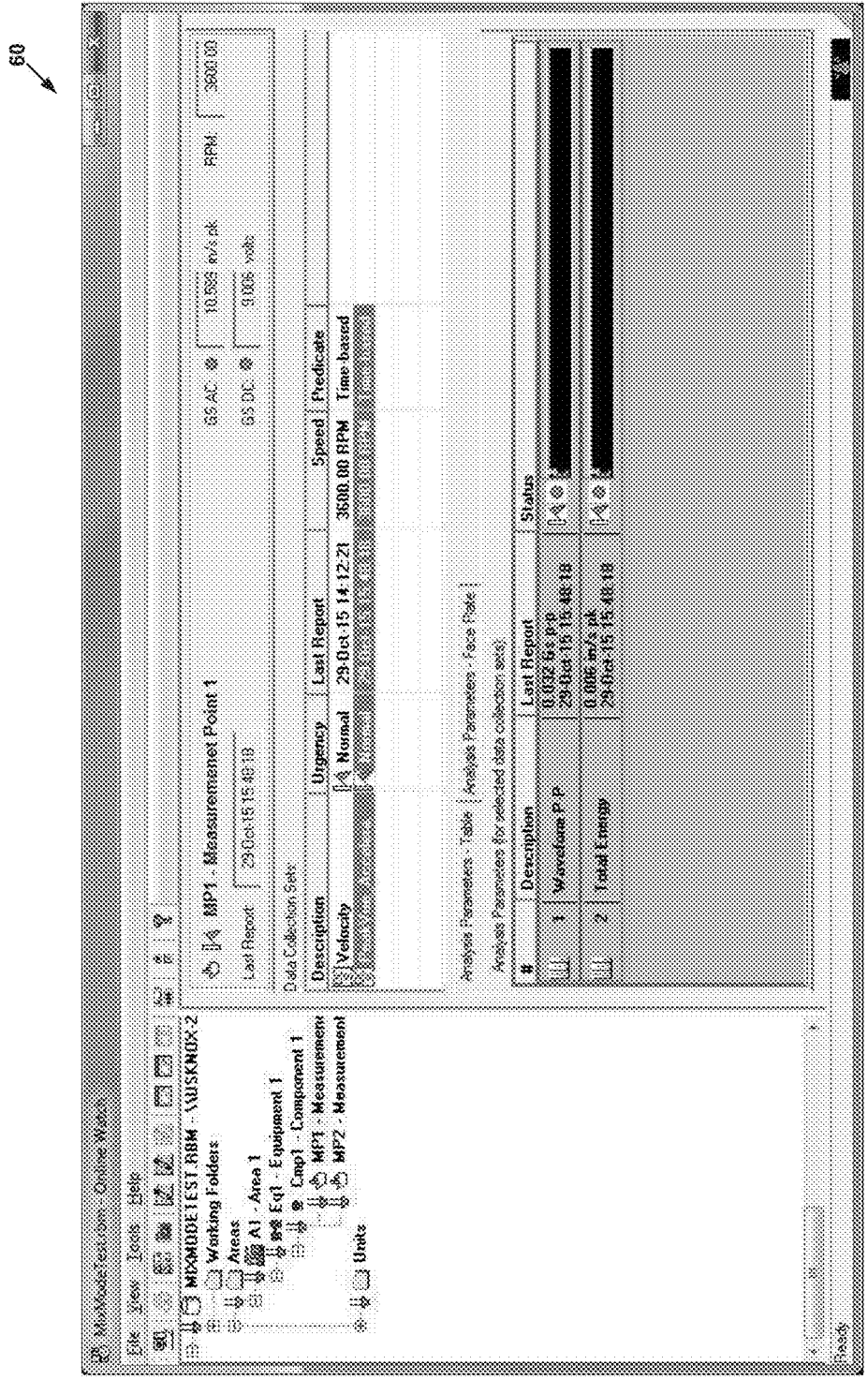
FIG. 6 depicts a data display screen according to an embodiment of the invention.
Figure 7:
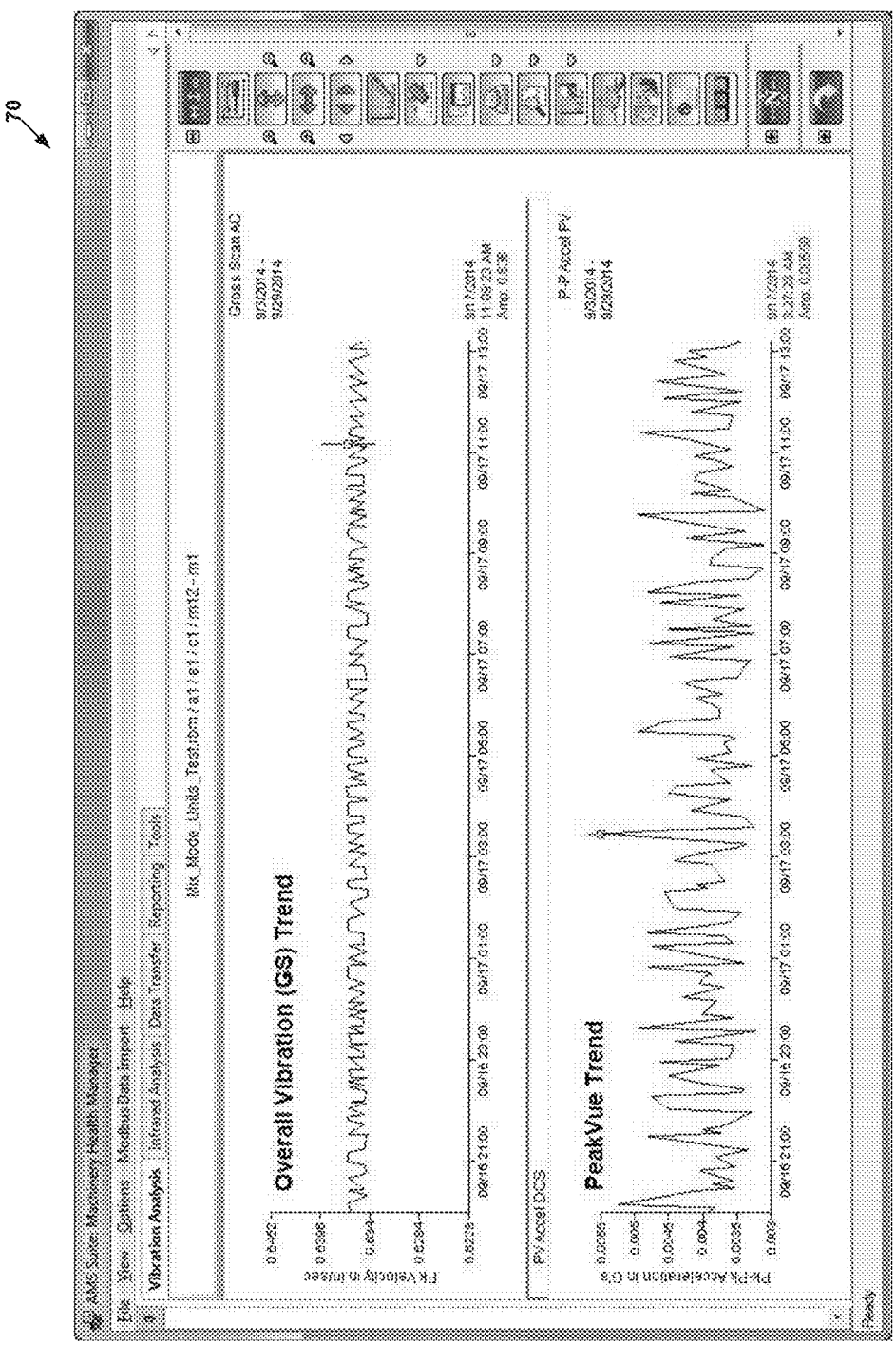
FIGS. 7, 8 and 9 depict data plots according to an embodiment of the invention.
Figure 8:
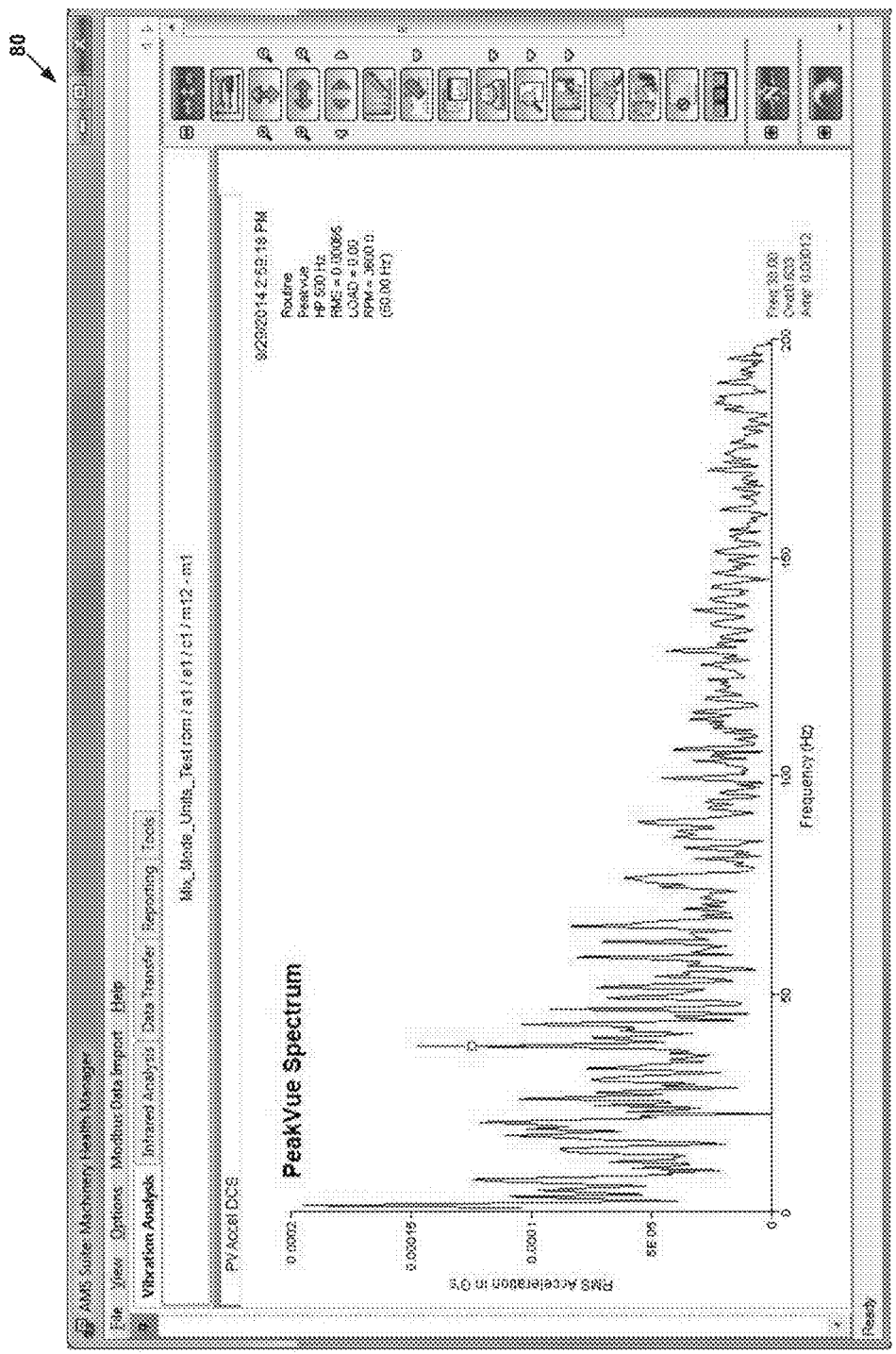
Figure 9:
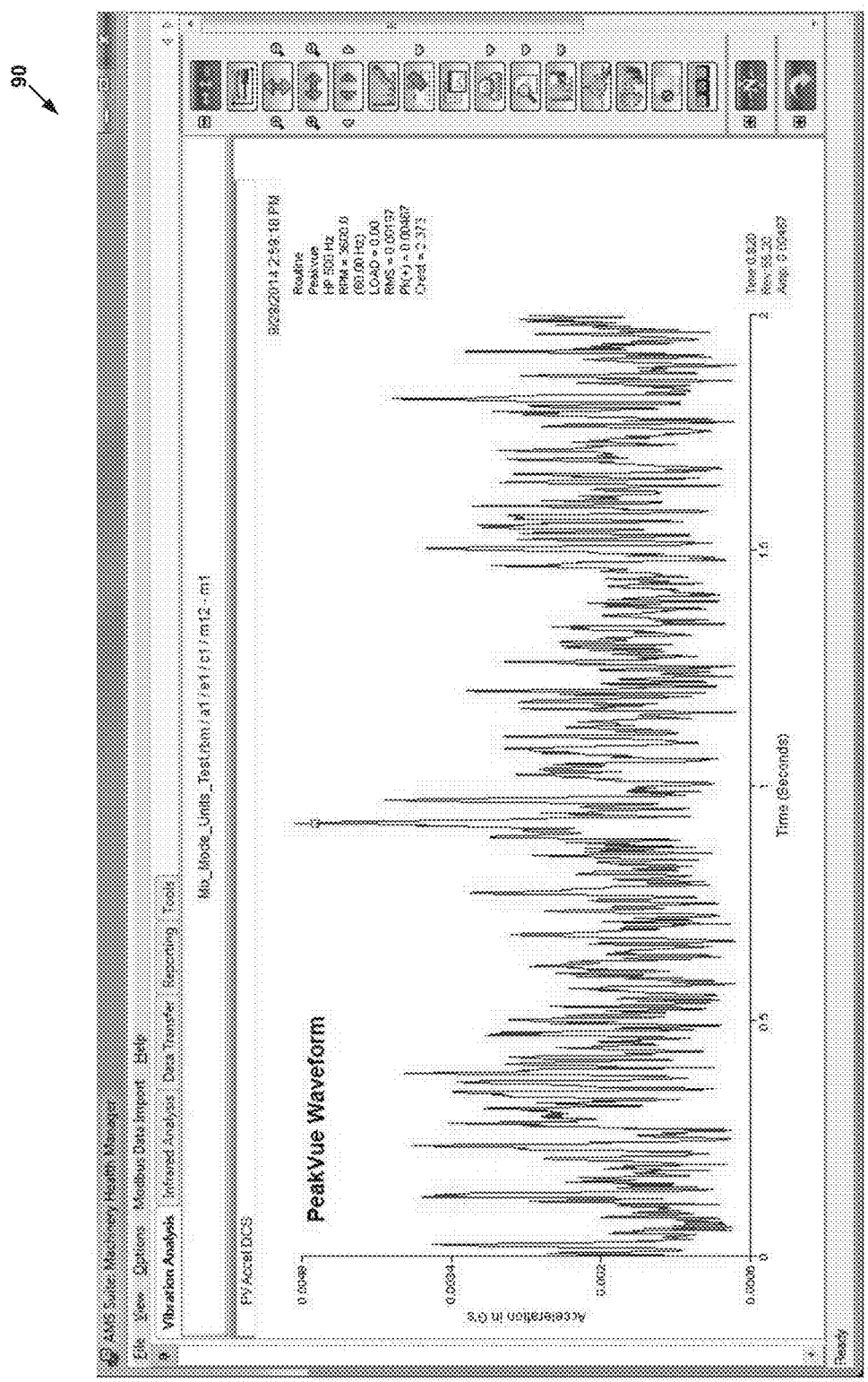

FIGS. 6-9 are examples of how the data appears when viewed using the Machinery Health Manager software 36. FIG. 6 depicts PeakVue analysis parameters being collected from a single channel that is configured to use hardware integration. FIG. 7 depicts plots of Gross Scan and PeakVue trends. FIG. 8 depicts a PeakVue spectrum and FIG. 9 depicts a PeakVue time waveform, both collected from a single measurement channel in which hardware integration is momentarily disabled.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A vibration measurement system for continuously monitoring vibration levels of a machine, the system having multiple measurement channels for measuring vibration at one or more locations on the machine, at least one of the multiple measurement channels comprising:

an acceleration sensor attached to the machine for sensing machine vibration and generating an analog acceleration signal based on the machine vibration;

an integrator for receiving the analog acceleration signal and generating an analog velocity signal based thereon; and a switch for receiving the analog acceleration signal and the analog velocity signal, the switch having a first position in which the analog velocity signal is selected, and a second position in which the analog acceleration signal is selected, wherein the switch normally maintains the first position, during which time the system continuously monitors the analog velocity signal or a signal derived from the analog velocity signal to assess an operating condition of the machine, and wherein the switch is operable to be momentarily set to the second position, during which time monitoring of the analog velocity signal is interrupted to provide for momentary measurement of the analog acceleration signal; and selection logic that generates a first control signal based at least in part on one or more input signals that indicate a state of the machine, wherein the first control signal causes the switch to be in the first position or the second position.

2. The vibration measurement system of claim 1 further comprising an RMS-to-DC converter for receiving the analog velocity signal or the analog acceleration signal and generating an Overall Vibration measurement based thereon, wherein while the switch is in the first position, the system continuously monitors the Overall Vibration measurement to assess an operating condition of the machine.

3. The vibration measurement system of claim 2 further comprising memory for maintaining a last valid Overall Vibration measurement based on the analog velocity signal that is present just prior to interruption of the analog velocity signal when the switch is set to the second position, thereby ensuring that the operating condition of the machine is assessed based on a valid Overall Vibration measurement.

4. The vibration measurement system of claim 2 wherein, upon the switch returning to the first position after being in the second position, the selection logic algorithmically analyzes the Overall Vibration measurement to determine a minimum settling time before which the monitoring of the Overall Vibration measurement is resumed to assess the operating condition of the machine.

5. The vibration measurement system of claim 1 further comprising:
   an analog-to-digital converter for sampling the analog acceleration signal and generating digital acceleration data based thereon; and
   a digital signal processor for processing the digital acceleration data, the digital signal processor including:
      a full-wave rectifier circuit for receiving and full-wave-rectifying the digital acceleration data;
      a peak hold circuit for generating a peak hold waveform comprising peak levels of the full-wave-rectified digital acceleration data; and
      a peak value calculation circuit for calculating a scalar value representing a peak level measured over a predetermined time or a predetermined number of data samples in the peak hold waveform.

6. The vibration measurement system of claim 1 wherein the selection logic generates a plurality of control signals based at least in part on the one or more input signals that indicate a state of the machine, the control signals comprising:
   the first control signal that causes the switch to be in the first position or the second position;
   a second control signal for use in selecting at least one of the multiple measurement channels for further processing; and
   a third control signal that selects a type of vibration measurement processing to be performed on the at least one measurement channel selected for further processing.

7. The vibration measurement system of claim 6 further comprising:
   a multiplexer having:
      a plurality of channel inputs for receiving the multiple measurement channels;
      a channel selection signal input for receiving the second control signal from the selection logic; and
      a multiplexer output,
      wherein, based on the second control signal, the multiplexer selects at least one of the multiple measurement channels at the plurality of channel inputs to appear the multiplexer output;
   an analog-to-digital converter for sampling the analog acceleration signal at the multiplexer output and generating digital acceleration data based thereon; and
   a digital signal processor for processing the digital acceleration data according to the type of vibration measurement processing indicated by the third control signal.

8. A method for continuously monitoring vibration levels at one or more locations on a machine using a vibration measurement system having multiple measurement channels, the method comprising:
   (a) in a first measurement channel of the multiple measurement channels, sensing machine vibration at a first location on the machine and generating a first analog acceleration signal based on the machine vibration;
   (b) integrating the first analog acceleration signal using a hardware integrator in the first measurement channel to generate an analog velocity signal;
   (c) continuously monitoring the analog velocity signal or a signal derived from the analog velocity signal using the first measurement channel;
   (d) generating a first control signal based at least in part on one or more input signals that indicate a state of the machine;
   (e) in the first measurement channel, discontinuing the monitoring of the analog velocity signal and commencing an acceleration measurement period based on the first control signal;
   (f) measuring the first analog acceleration signal using the first measurement channel during the acceleration measurement period; and
   (g) upon conclusion of the acceleration measurement period, resuming the continuous monitoring of the analog velocity signal using the first measurement channel.

9. The method of claim 8 wherein step (d) comprises selection logic receiving the one or more input signals that indicate a change of operational state of the machine and the selection logic generating the first control signal based at least in part on the change of operational state.

10. The method of claim 9 wherein the one or more input signals that indicate a change of operational state of the machine comprise one or more of an Overall Vibration signal, a speed signal, and a discrete input.

11. The method of claim 8 wherein step (d) comprises generating the first control signal at periodic intervals.

12. The method of claim 8 further comprising waiting for a first settling time during the acceleration measurement period, the first settling time occurring after the discontinuance of monitoring the analog velocity signal and prior to the measurement of the first analog acceleration signal.

13. The method of claim 8 further comprising waiting for a second settling time during the acceleration measurement period, the second settling time occurring after the measurement of the first analog acceleration signal and prior to resumption of monitoring the analog velocity signal.

14. The method of claim 8 wherein measuring the first analog acceleration signal in the first measurement channel comprises:
   (f1) sampling the first analog acceleration signal and generating digital acceleration data based thereon;
   (f2) full-wave-rectifying the digital acceleration data;
   (f3) generating a peak hold waveform comprising peak levels of the full-wave-rectified digital acceleration data; and (f4) calculating a scalar value representing a peak level measured over a predetermined time or a predetermined number of data samples in the peak hold waveform.

15. The method of claim 8 further comprising deriving an Overall Vibration signal from the analog velocity signal, and wherein step (c) comprises continuously monitoring the Overall Vibration signal using the first measurement channel.

16. The method of claim 8 wherein step (e) further comprises discontinuing the monitoring of the analog velocity signal by activating a switch in the first measurement channel to bypass the hardware integrator during the acceleration measurement period.

17. The method of claim 8 further comprising maintaining a last valid analog velocity signal during the acceleration measurement period.

18. A method for continuously monitoring vibration levels of a machine using a vibration measurement system having multiple measurement channels, the method comprising:
(a) continuously sensing machine vibration at multiple locations on the machine and generating multiple analog acceleration signals in the multiple measurement channels based on the machine vibration;
(b) in each measurement channel in which velocity measurements are enabled, integrating the analog acceleration signal using a hardware integrator in the measurement channel to generate an analog velocity signal;
(c) continuously monitoring analog velocity signals generated in step (b) or signals derived from analog velocity signals generated in step (b);
(d) continuously monitoring one or more input signals that are indicative of an operational state of the machine;
(e) determining based on the one or more input signals that acceleration measurements are to be made in a first measurement channel of the multiple measurement channels;
(f) disabling velocity measurements in the first measurement channel by bypassing the hardware integrator in the first measurement channel;
(g) performing acceleration measurements in the first measurement channel; and
(h) upon conclusion of performance of acceleration measurements in the first measurement channel, enabling velocity measurements in the first measurement channel by enabling operation of the hardware integrator.

19. The method of claim 18 wherein the one or more input signals that are indicative of an operational state of the machine comprise one or more of an Overall Vibration signal, a speed signal, and a discrete input.

20. The method of claim 18 wherein step (g) comprises:
(g1) sampling the analog acceleration signal in the first measurement channel and generating digital acceleration data based thereon;
(g2) full-wave-rectifying the digital acceleration data;
(g3) generating a peak hold waveform comprising peak levels of the full-wave-rectified digital acceleration data; and
(g4) calculating a scalar value representing a peak level measured over a predetermined time or a predetermined number of data samples in the peak hold waveform.

* * * * *